(12) United States Patent
Tyler et al.

(10) Patent No.: US 10,629,884 B2
(45) Date of Patent: *Apr. 21, 2020

(54) FLEXIBLE RIBS OF A BUS BAR CARRIER

(71) Applicant: CPS Technology Holdings LLC, New York, NY (US)

(72) Inventors: Matthew R. Tyler, Brown Deer, WI (US); Christopher M. Bonin, Glendale, WI (US); John P. Dinkelman, South Milwaukee, WI (US); Richard M. DeKeuster, Racine, WI (US); Dale B. Trester, Milwaukee, WI (US)

(73) Assignee: CPS Technology Holdings LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/991,984

(22) Filed: May 29, 2018

(65) Prior Publication Data

US 2018/0277820 A1    Sep. 27, 2018

Related U.S. Application Data

(63) Continuation of application No. 14/795,518, filed on Jul. 9, 2015, now Pat. No. 9,985,265.

(Continued)

(51) Int. Cl.
*H01M 2/20* (2006.01)
*H01M 10/0525* (2010.01)
(Continued)

(52) U.S. Cl.
CPC .............. *H01M 2/206* (2013.01); *B60L 50/64* (2019.02); *H01M 2/0277* (2013.01);
(Continued)

(58) Field of Classification Search
CPC .. H01M 2/206; H01M 10/482; H01M 2/1077; H01M 2/0277; H01M 10/48;
(Continued)

(56) References Cited

U.S. PATENT DOCUMENTS 8,999,551 B2   4/2015   Lietz et al.
9,159,970 B2   10/2015  Watanabe et al.
(Continued)

FOREIGN PATENT DOCUMENTS

DE   10 2009 024514 A1   12/2010
EP      2 437 329 A1      4/2012
(Continued)

OTHER PUBLICATIONS

PCT/US2016/018458 International Search Report and Written Opinion dated Jul. 11, 2016.

*Primary Examiner* — Michael L Dignan
(74) *Attorney, Agent, or Firm* — Boardman & Clark LLP

(57) ABSTRACT

The present disclosure includes a battery module having a housing with a cell receptacle region defined by walls of the housing and configured to enable passage of electrochemical cells therethrough. The battery module also includes a bus bar carrier sealed in the cell receptacle region. The bus bar carrier includes a perimeter having flexible ribs extending along at least a majority of the perimeter and configured to enable intimate contact between the walls of the housing and the perimeter of the bus bar carrier.

19 Claims, 7 Drawing Sheets

Related U.S. Application Data

(60) Provisional application No. 62/146,761, filed on Apr. 13, 2015.

(51) Int. Cl.
| | | |
|---|---|---|
| *H01M 2/10* | (2006.01) | |
| *H01M 10/48* | (2006.01) | |
| *H01M 2/02* | (2006.01) | |
| *B60L 50/64* | (2019.01) | |
| *H01M 10/052* | (2010.01) | |
| *B60L 58/24* | (2019.01) | |

(52) U.S. Cl.
CPC ....... *H01M 2/1072* (2013.01); *H01M 2/1077* (2013.01); *H01M 10/0525* (2013.01); *H01M 10/48* (2013.01); *H01M 10/482* (2013.01); *H01M 10/486* (2013.01); *B60L 58/24* (2019.02); *H01M 2/0217* (2013.01); *H01M 10/052* (2013.01); *H01M 2220/20* (2013.01); *Y02E 60/122* (2013.01); *Y02P 70/54* (2015.11); *Y02T 10/705* (2013.01); *Y02T 10/7011* (2013.01)

(58) Field of Classification Search
CPC ........... H01M 2/1072; H01M 10/0525; H01M 10/486; H01M 10/052; H01M 2/0217; H01M 2220/20; B60L 50/64; B60L 58/24; Y02T 10/7011; Y02T 10/705; Y02P 70/54; Y02E 60/122

See application file for complete search history.

(56) References Cited

U.S. PATENT DOCUMENTS

| | | | |
|---|---|---|---|
| 9,616,766 B2* | 4/2017 | Fujii | ................. B60L 50/64 |
| 2012/0308860 A1 | 12/2012 | Pizzurro et al. | |
| 2013/0143079 A1 | 6/2013 | Huang et al. | |
| 2013/0288105 A1* | 10/2013 | Niedzwiecki | ....... H01M 2/1077 |
| | | | 429/156 |
| 2013/0344377 A1* | 12/2013 | Ogasawara | ......... H01M 2/1077 |
| | | | 429/158 |
| 2014/0079982 A1 | 3/2014 | Laderer et al. | |
| 2014/0238723 A1* | 8/2014 | Ogasawara | ............ H01B 17/14 |
| | | | 174/135 |
| 2014/0363711 A1 | 12/2014 | Zhao | |

FOREIGN PATENT DOCUMENTS

| | | | | |
|---|---|---|---|---|
| GB | 975059 | | 11/1964 | |
| JP | 2001345082 | | 12/2001 | |
| JP | WO 2014034079 | * | 3/2014 | ............. H01M 2/10 |

\* cited by examiner

FLEXIBLE RIBS OF A BUS BAR CARRIER

CROSS-REFERENCE TO RELATED APPLICATION

This application is a continuation of U.S. Pat. No. 9,985,265, issued May 29, 2018, entitled "FLEXIBLE RIBS OF A BUS BAR CARRIER," which claims priority from and the benefit of U.S. Provisional Application Ser. No. 62/146,761, filed Apr. 13, 2015, entitled "B-CARRIER TO HOUSING LASER WELDING JOINT DESIGN WITH FLEXIBLE RIBS," which is hereby incorporated by reference in its entirety for all purposes.

BACKGROUND

The present disclosure relates generally to the field of batteries and battery modules. More specifically, the present disclosure relates to flexible ribs of a bus bar carrier and corresponding welding techniques for welding the bus bar carrier to a housing of the battery module.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A vehicle that uses one or more battery systems for providing all or a portion of the motive power for the vehicle can be referred to as an xEV, where the term "xEV" is defined herein to include all of the following vehicles, or any variations or combinations thereof, that use electric power for all or a portion of their vehicular motive force. For example, xEVs include electric vehicles (EVs) that utilize electric power for all motive force. As will be appreciated by those skilled in the art, hybrid electric vehicles (HEVs), also considered xEVs, combine an internal combustion engine propulsion system and a battery-powered electric propulsion system, such as 48 Volt (V) or 130V systems. The term HEV may include any variation of a hybrid electric vehicle. For example, full hybrid systems (FHEVs) may provide motive and other electrical power to the vehicle using one or more electric motors, using only an internal combustion engine, or using both. In contrast, mild hybrid systems (MHEVs) disable the internal combustion engine when the vehicle is idling and utilize a battery system to continue powering the air conditioning unit, radio, or other electronics, as well as to restart the engine when propulsion is desired. The mild hybrid system may also apply some level of power assist, during acceleration for example, to supplement the internal combustion engine. Mild hybrids are typically 96V to 130V and recover braking energy through a belt or crank integrated starter generator. Further, a micro-hybrid electric vehicle (mHEV) also uses a "Stop-Start" system similar to the mild hybrids, but the micro-hybrid systems of a mHEV may or may not supply power assist to the internal combustion engine and operates at a voltage below 60V. For the purposes of the present discussion, it should be noted that mHEVs typically do not technically use electric power provided directly to the crankshaft or transmission for any portion of the motive force of the vehicle, but an mHEV may still be considered as an xEV since it does use electric power to supplement a vehicle's power needs when the vehicle is idling with internal combustion engine disabled and recovers braking energy through an integrated starter generator. In addition, a plug-in electric vehicle (PEV) is any vehicle that can be charged from an external source of electricity, such as wall sockets, and the energy stored in the rechargeable battery packs drives or contributes to drive the wheels. PEVs are a subcategory of EVs that include all-electric or battery electric vehicles (BEVs), plug-in hybrid electric vehicles (PHEVs), and electric vehicle conversions of hybrid electric vehicles and conventional internal combustion engine vehicles.

xEVs as described above may provide a number of advantages as compared to more traditional gas-powered vehicles using only internal combustion engines and traditional electrical systems, which are typically 12V systems powered by a lead acid battery. For example, xEVs may produce fewer undesirable emission products and may exhibit greater fuel efficiency as compared to traditional internal combustion vehicles and, in some cases, such xEVs may eliminate the use of gasoline entirely, as is the case of certain types of EVs or PEVs.

As technology continues to evolve, there is a need to provide improved power sources, particularly battery modules, for such vehicles. For example, in traditional configurations, battery modules may include electrochemical cells disposed in a housing through an opening in the housing. Traditional configurations may also include a lid (e.g., carrier) disposed over the electrochemical cells and within the opening of the housing. It is now recognized that it is desirable to facilitate maintaining a lid or similar feature in the opening of the housing and over the electrochemical cells.

SUMMARY

A summary of certain embodiments disclosed herein is set forth below. It should be understood that these aspects are presented merely to provide the reader with a brief summary of certain embodiments and that these aspects are not intended to limit the scope of this disclosure. Indeed, this disclosure may encompass a variety of aspects that may not be set forth below.

The present disclosure relates to a battery module having a housing with a cell receptacle region defined by walls of the housing and configured to enable passage of electrochemical cells therethrough. The battery module also includes a bus bar carrier sealed in the cell receptacle region. The bus bar carrier includes a perimeter having flexible ribs extending along at least a majority of the perimeter and configured to enable intimate contact between the walls of the housing and the perimeter of the bus bar carrier.

The present disclosure also relates a battery module having a plastic housing with a cell receptacle opening, prismatic lithium-ion (Li-ion) electrochemical cells disposed in the housing through the cell receptacle opening, and bus bars configured to electrically interconnect the prismatic lithium-ion (Li-ion) electrochemical cells. The battery module also includes a bus bar carrier on which the plurality of bus bars is disposed. The bus bar carrier is positioned over the prismatic Li-ion electrochemical cells and within the cell receptacle opening of the plastic housing. Further, the bus bar carrier includes flexible ribs extending along a plastic perimeter of the bus bar carrier and configured to enable intimate contact between the plastic perimeter and the plastic housing. Further still, the plastic perimeter is welded to the plastic housing.

The present disclosure also relates to a method of manufacturing a battery module. The method includes disposing electrochemical cells through a cell receptacle region of a housing of the battery module, disposing a bus bar carrier over the electrochemical cells and into the cell receptacle region of the housing, and welding flexible ribs extending along a perimeter of the bus bar carrier to walls of the housing, where the walls of the housing at least partially define the cell receptacle region of the housing.

DRAWINGS

Various aspects of this disclosure may be better understood upon reading the following detailed description and upon reference to the drawings in which.

DETAILED DESCRIPTION

Figure 1:
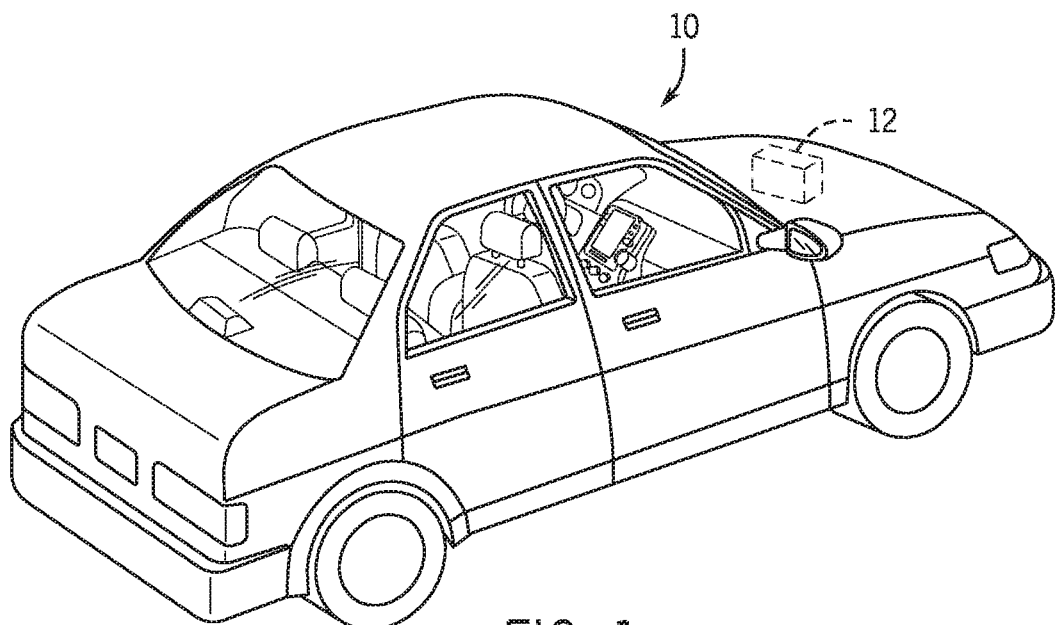
FIG. 1 is a perspective view of a vehicle having a battery system configured in accordance with present embodiments to provide power for various components of the vehicle.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The battery systems described herein may be used to provide power to various types of electric vehicles (xEVs) and other high voltage energy storage/expending applications (e.g., electrical grid power storage systems). Such battery systems may include one or more battery modules, each battery module having a number of battery cells (e.g., lithium-ion (Li-ion) electrochemical cells) arranged and electrically interconnected to provide particular voltages and/or currents useful to power, for example, one or more components of an xEV. As another example, battery modules in accordance with present embodiments may be incorporated with or provide power to stationary power systems (e.g., non-automotive systems).

In accordance with embodiments of the present disclosure, the battery module may include a housing having a cell receptacle region (e.g., an opening) configured to enable passage of electrochemical cells therethrough, such that the electrochemical cells may be positioned within an interior of the housing. A carrier (e.g., bus bar carrier, electronics carrier, lid) may be disposed over the electrochemical cells and within the cell receptacle region, after the electrochemical cells are disposed in the interior of the housing. The bus bar carrier may include a number of bus bars disposed thereon, where the bus bars enable electrical connections between terminals of the electrochemical cells. For example, each bus bar may span between a first terminal of a first electrochemical cell and a second terminal of a second electrochemical cell to provide an electrical path between the first and second electrochemical cells. In some embodiments, the bus bar carrier may also include sensors disposed thereon, where the sensors are configured to sense voltage, temperature, or both proximate to (or within) one or more of the bus bars.

In accordance with the present disclosure, the bus bar carrier may include a base (e.g., an aspect configured to hold the bus bars and/or sensors) and a perimeter extending around the base. The perimeter may include a number of flexible ribs disposed adjacent to one another and configured to enable intimate contact between the bus bar carrier and walls of the housing (e.g., where the walls at least partially define the cell receptacle region of the housing), such that the bus bar carrier may be welded to the walls of the housing. For example, due to manufacturing imperfections (e.g., tolerances) and other factors described in detail below, dimensions of the housing and dimensions of the bus bar carrier may only partially correspond with one another. In other words, the bus bar carrier may fit imperfectly in the cell receptacle region.

However, the flexible ribs are each configured to flex to accommodate variable dimensions of the housing and/or bus bar carrier. In other words, each flexible rib may be configured to move at least partially independently from the other flexible ribs, such that each flexible rib flexes to its own degree to accommodate a more accurate fit of the bus bar carrier within the cell receptacle region defined by the walls of the housing. By facilitating the more accurate fit, the flexible ribs enable intimate contact between the bus bar carrier and the walls of the housing. The intimate contact between the bus bar carrier and the walls of the housing facilitates improved welding of the bus bar carrier (e.g., of each flexible rib) to the walls of the housing. By welding the bus bar carrier to the housing along the flexible ribs, the bus bar carrier is at least partially fixed with respect to the housing. Further, because the intimate contact between the flexible ribs and the walls of the housing enables stronger, more resilient, and more accurate welds between the two, the welds are more capable of handling thermal expansion of various portions of the housing during operation of the battery module. These and other features will be described in detail below with reference to the figures.

To help illustrate, FIG. 1 is a perspective view of an embodiment of a vehicle 10, which may utilize a regenerative braking system. Although the following discussion is presented in relation to vehicles with regenerative braking systems, the techniques described herein are adaptable to other vehicles that capture/store electrical energy with a battery, which may include electric-powered and gas-powered vehicles.

As discussed above, it would be desirable for a battery system 12 to be largely compatible with traditional vehicle designs. Accordingly, the battery system 12 may be placed in a location in the vehicle 10 that would have housed a traditional battery system. For example, as illustrated, the vehicle 10 may include the battery system 12 positioned similarly to a lead-acid battery of a typical combustion-engine vehicle (e.g., under the hood of the vehicle 10). Furthermore, as will be described in more detail below, the battery system 12 may be positioned to facilitate managing temperature of the battery system 12. For example, in some embodiments, positioning a battery system 12 under the hood of the vehicle 10 may enable an air duct to channel airflow over the battery system 12 and cool the battery system 12.

Figure 2:
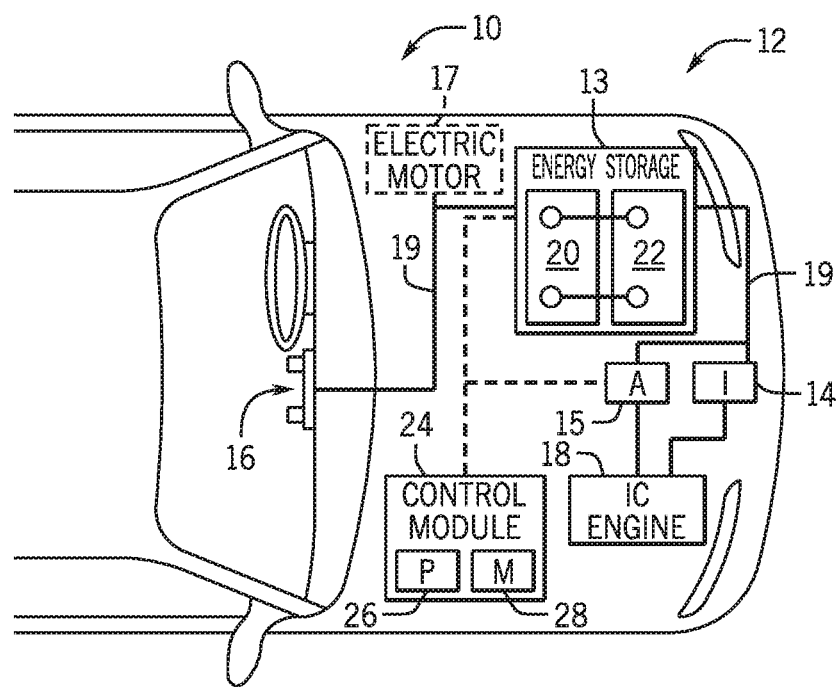
FIG. 2 is a cutaway schematic view of an embodiment of the vehicle and the battery system of FIG. 1, in accordance with an aspect of the present disclosure.

A more detailed view of the battery system 12 is described in FIG. 2. As depicted, the battery system 12 includes an energy storage component 13 coupled to an ignition system 14, an alternator 15, a vehicle console 16, and optionally to an electric motor 17. Generally, the energy storage component 13 may capture/store electrical energy generated in the vehicle 10 and output electrical energy to power electrical devices in the vehicle 10.

In other words, the battery system 12 may supply power to components of the vehicle's electrical system, which may include radiator cooling fans, climate control systems, electric power steering systems, active suspension systems, auto park systems, electric oil pumps, electric super/turbochargers, electric water pumps, heated windscreen/defrosters, window lift motors, vanity lights, tire pressure monitoring systems, sunroof motor controls, power seats, alarm systems, infotainment systems, navigation features, lane departure warning systems, electric parking brakes, external lights, or any combination thereof. Illustratively, in the depicted embodiment, the energy storage component 13 supplies power to the vehicle console 16 and the ignition system 14, which may be used to start (e.g., crank) the internal combustion engine 18.

Additionally, the energy storage component 13 may capture electrical energy generated by the alternator 15 and/or the electric motor 17. In some embodiments, the alternator 15 may generate electrical energy while the internal combustion engine 18 is running. More specifically, the alternator 15 may convert the mechanical energy produced by the rotation of the internal combustion engine 18 into electrical energy. Additionally or alternatively, when the vehicle 10 includes an electric motor 17, the electric motor 17 may generate electrical energy by converting mechanical energy produced by the movement of the vehicle 10 (e.g., rotation of the wheels) into electrical energy. Thus, in some embodiments, the energy storage component 13 may capture electrical energy generated by the alternator 15 and/or the electric motor 17 during regenerative braking. As such, the alternator 15 and/or the electric motor 17 are generally referred to herein as a regenerative braking system.

To facilitate capturing and supplying electric energy, the energy storage component 13 may be electrically coupled to the vehicle's electric system via a bus 19. For example, the bus 19 may enable the energy storage component 13 to receive electrical energy generated by the alternator 15 and/or the electric motor 17. Additionally, the bus 19 may enable the energy storage component 13 to output electrical energy to the ignition system 14 and/or the vehicle console 16. Accordingly, when a 12 volt battery system 12 is used, the bus 19 may carry electrical power typically between 8-18 volts.

Additionally, as depicted, the energy storage component 13 may include multiple battery modules. For example, in the depicted embodiment, the energy storage component 13 includes a lithium ion (e.g., a first) battery module 20 in accordance with present embodiments, and a lead-acid (e.g., a second) battery module 22, where each battery module 20, 22 includes one or more battery cells. In other embodiments, the energy storage component 13 may include any number of battery modules. Additionally, although the lithium ion battery module 20 and lead-acid battery module 22 are depicted adjacent to one another, they may be positioned in different areas around the vehicle. For example, the lead-acid battery module 22 may be positioned in or about the interior of the vehicle 10 while the lithium ion battery module 20 may be positioned under the hood of the vehicle 10.

In some embodiments, the energy storage component 13 may include multiple battery modules to utilize multiple different battery chemistries. For example, when the lithium ion battery module 20 is used, performance of the battery system 12 may be improved since the lithium ion battery chemistry generally has a higher coulombic efficiency and/or a higher power charge acceptance rate (e.g., higher maximum charge current or charge voltage) than the lead-acid battery chemistry. As such, the capture, storage, and/or distribution efficiency of the batten system 12 may be improved.

To facilitate controlling the capturing and storing of electrical energy, the battery system 12 may additionally include a control module 24. More specifically, the control module 24 may control operations of components in the battery system 12, such as relays (e.g., switches) within energy storage component 13, the alternator 15, and/or the electric motor 17. For example, the control module 24 may regulate amount of electrical energy captured/supplied by each battery module 20 or 22 (e.g., to de-rate and re-rate the battery system 12), perform load balancing between the battery modules 20 and 22, determine a state of charge of each battery module 20 or 22, determine temperature of each battery module 20 or 22, control voltage output by the alternator 15 and/or the electric motor 17, and the like.

Accordingly, the control unit 24 may include one or more processor 26 and one or more memory 28. More specifically, the one or more processor 26 may include one or more application specific integrated circuits (ASICs), one or more field programmable gate arrays (FPGAs), one or more general purpose processors, or any combination thereof. Additionally, the one or more memory) 28 may include volatile memory, such as random access memory (RAM), and/or non-volatile memory, such as read-only memory (ROM), optical drives, hard disc drives, or solid-state drives. In some embodiments, the control unit 24 may include portions of a vehicle control unit (VCU) and/or a separate battery control module.

Figure 3:
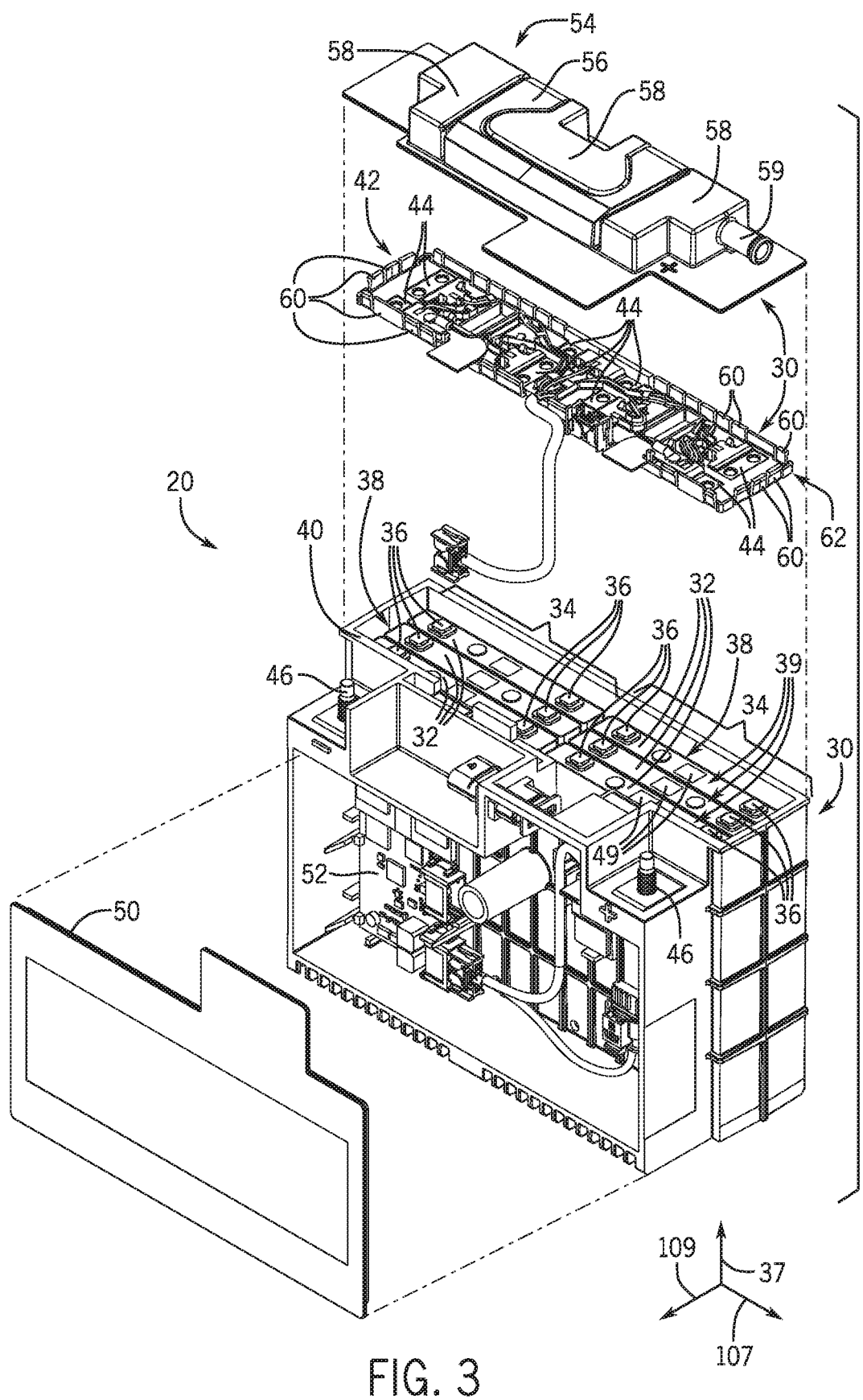
FIG. 3 is an exploded perspective view of an embodiment of a battery module for use in the vehicle of FIG. 2, in accordance with an aspect of the present disclosure.

An overhead exploded perspective view of an embodiment of the battery module 20 for use in the vehicle 10 of FIG. 2 is shown in FIG. 3. In the illustrated embodiment, the battery module 20 (e.g., lithium ion [Li-ion] battery module) includes a housing 30 and electrochemical cells 32 disposed inside the housing 30. For example, the electrochemical cells 32 are received through a cell receptacle region 38 (e.g., opening) of the housing 30 and into the inside of the housing 30. In the illustrated embodiment, six prismatic lithium-ion (Li-ion) electrochemical cells 32 are disposed in two stacks 34 within the housing 30, three electrochemical cells 32 in each stack 34. However, in other embodiments, the battery module 20 may include any number of electrochemical cells 32 (e.g., 2, 3, 4, 5, 6, 7, 8, 9, 10, or more electrochemical cells), any type of electrochemical cell 32 (e.g., Li-ion, lithium polymer, lead-acid, nickel cadmium, or nickel metal hydride, prismatic, and/or cylindrical), and any arrangement of the electrochemical cells 32 (e.g., stacked, separated, or compartmentalized).

As shown, the electrochemical cells 32 may include terminals 36 extending upwardly (e.g., in direction 37) from terminal ends 39 of the electrochemical cells 32. Accordingly, the terminals 36 may extend into the cell receptacle region 38 in an upper side 40 (e.g., upper end, upper face) of the housing 30. For example, the electrochemical cells 32 may be inserted into the housing 30 through the cell receptacle region 38 in the upper side 40, and positioned within the housing 30 such that the terminals 36 of the electrochemical cells 32 are disposed in the cell receptacle region 38. A bus bar carrier 42 may be disposed into the cell receptacle region 38 and may retain bus bars 44 disposed thereon, where the bus bars 44 are configured to interface with the terminals 36 of the electrochemical cells 32. For example, the bus bars 44 may interface with the terminals 36 to electrically couple adjacent electrochemical cells 32 together. Depending on the embodiment, the bus bars 44 may couple the electrochemical cells 32 in series, in parallel, or some of the electrochemical cells 32 in series and some of the electrochemical cells 32 in parallel. Further, certain of the bus bars 44 may be configured to electrically couple the electrically interconnected group of electrochemical cells 32 with major terminals 46 of the battery module 20, where the major terminals 46 are configured to be coupled to a load (e.g., component(s) of the vehicle 10) to power the load. The electrochemical cells 32 also include vents 49 disposed on the terminal ends 39 of the electrochemical cells 32 and configured to enable gases from within the electrochemical cells 32 to vent into the inside of the housing 30 in certain operating conditions (e.g., if a pressure within one or more individual electrochemical cell 32 exceeds a cell venting pressure threshold of the corresponding one or more individual electrochemical cells 32).

The housing 30 of the battery module 20 includes one or more covers configured to seal the housing 30. For example, the housing 30 may include a lateral cover 50 that fits over a lateral side 52 of the housing 30, where the lateral side 52 of the housing 30 retains, for example, a printed circuit board (PCB) 52 and other electrical components of the battery module 20. An upper cover 54 may be disposed over the upper side 40 of the housing 30 (and over the bus bar carrier 42) to seal the upper side 40 of the housing 30. The upper cover 54 of the housing 30 may include a handle 56 embedded within the upper cover 54 and configured to facilitate transportation of the battery module 20 from one place to another. Further, the upper cover 54 may include one or more chambers 58 configured to at least partially define a vent path of the battery module 20. Further still, the upper cover 54 may include a vent spout 59 of the vent path through which gases or fluids may vent if an internal pressure within the housing 30 exceeds a venting pressure threshold of the battery module 20.

In accordance with embodiments of the present disclosure, the bus bar carrier 42 may be welded or otherwise coupled to the housing 30 to fix the bus bar carrier 42 within the cell receptacle region 38 and over the electrochemical cells 32. Welding the bus bar carrier 42 to the housing 30 may facilitate resilient coupling of the bus bars 44 with the terminals 36 of the electrochemical cells 32. To facilitate the welding, the bus bar carrier 42 may include flexible ribs 60 extending along a perimeter 62 of the bus bar carrier 42. Each of the flexible ribs 60 is configured to flex independently from the other flexible ribs 60. Accordingly, the flexible ribs 60, as a unit, enable intimate contact between the bus bar carrier 42 and the housing 30 even if edges or walls of the housing 30 (e.g., the walls the flexible ribs 60 contact) are not perfectly straight. For example, due to manufacturing tolerances and certain other factors, portions of the housing 30 to which the flexible ribs 60 are welded may be slightly curvilinear. The flexible functionality of the ribs 60 accommodates curves of the housing 30 to enable improved contact between the bus bar carrier 42 and the housing 30, compared to embodiments not having the flexible ribs 60.

Figure 4:
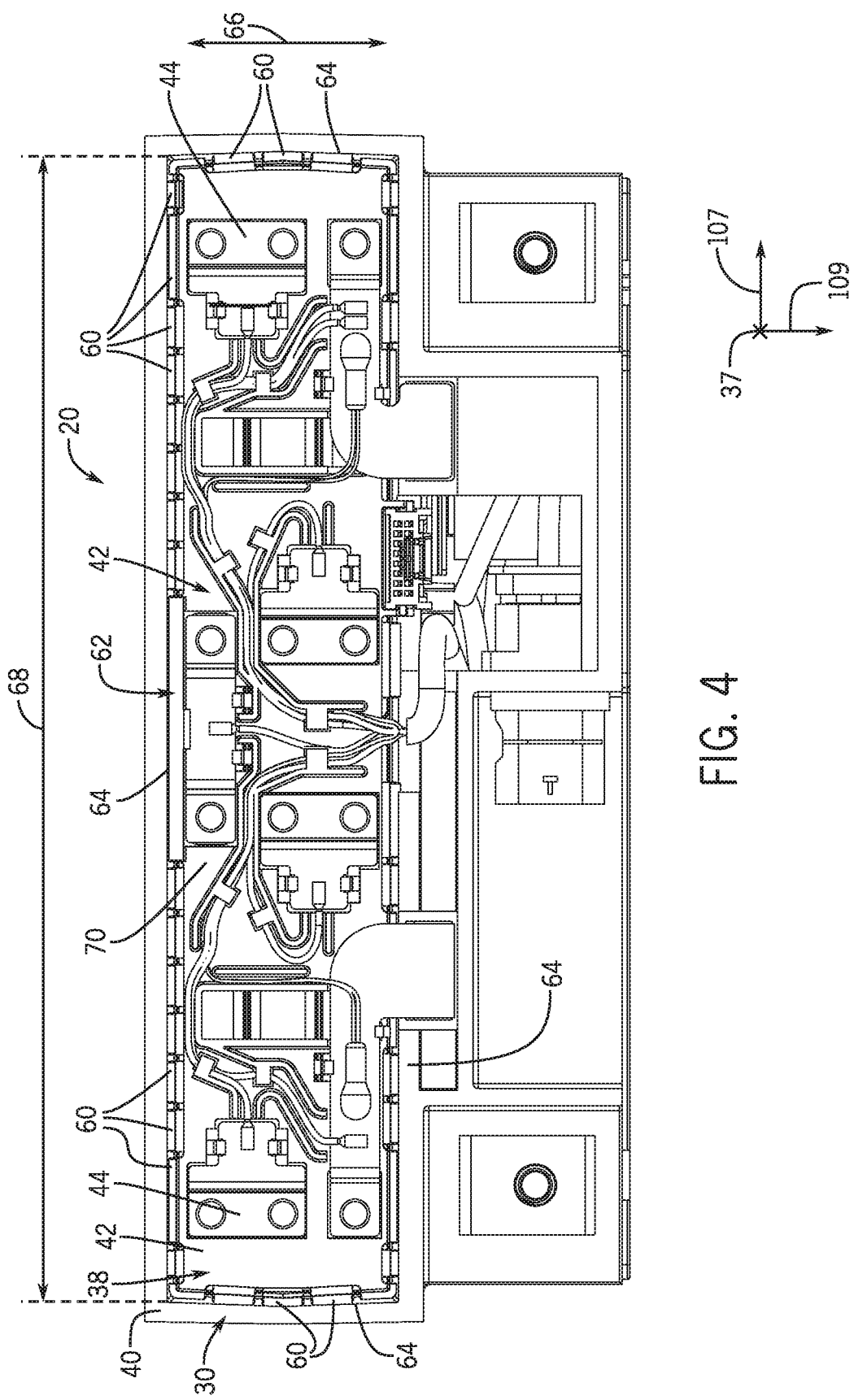
FIG. 4 is a top partially assembled view of the battery module of FIG. 3, in accordance with an aspect of the present disclosure.

A top partially assembled view of an embodiment of the battery module 20 of FIG. 3 is shown in FIG. 4. As shown, the bus bar carrier 42 of the battery module 20 is disposed in the cell receptacle region 38 of the housing 30. The cell receptacle region 38 is defined at least in part by four walls 64 of the housing 30 extending around the cell receptacle region 38. Further, in the illustrated embodiment, the bus bar carrier 42 is welded to the four walls 64, as described below.

Due to manufacturing imperfections (e.g., tolerances), any one of the four walls 64 to which the bus bar carrier 42 is welded may not be perfectly straight or may not correspond perfectly with the bus bar carrier 42. Further, a width 66 and/or length 68 of the cell receptacle region 38 may vary slightly from one battery module 20 to another. Accordingly, as the bus bar carrier 42 is disposed into the cell receptacle region 38 during manufacturing, one or more of the flexible ribs 60 (e.g., the flexible ribs 60 extending upwardly [in direction 37] from a base 70 of the bus bar carrier 42 and along the perimeter 62 of the bus bar carrier 42) may flex as the one or more flexible ribs 60 contact the corresponding wall(s) 64 of the housing 30. After the bus bar carrier 42 is inserted into the cell receptacle region 38, certain of the flexible ribs 60 may be flexed to a greater extent than certain of the other flexible ribs 60 due to local geometry (e.g., curvature) in one or more of the walls 64 of the housing 30. The flexible nature of the ribs 60 enables improved contact between the bus bar carrier 42 and the walls 64 of the housing 30, thereby facilitating more accurate and more resilient welds between the bus bar carrier 42 (e.g., the ribs 60 of the bus bar carrier 42) and the walls 64 of the housing 30.

Further, during operation of the battery module 20, each of the flexible ribs 60 may flex inwards and/or outwards to accommodate thermal expansion (e.g., movement) of local areas of the housing 30 (e.g., the walls 64 of the housing 30) and/or of the bus bar carrier 42. Accordingly, forces exerted by the thermal expansion are at least partially transferred to, or absorbed by, flex or hinge regions of the ribs 60 (e.g., about which the ribs 60 flex), as opposed to being exerted fully on the welds between the ribs 60 and the walls 64 of the housing 30. The flexible nature of the ribs 60, then, enables more resilient coupling of the bus bar carrier 42 to the housing 30, which causes the bus bar carrier 42 to be at least partially fixed relative to the housing 30 and improves durability of connections between electrical components (e.g., bus bars 44) on the bus bar carrier 42 and terminals 36 of the electrochemical cells 32.

Figure 5:
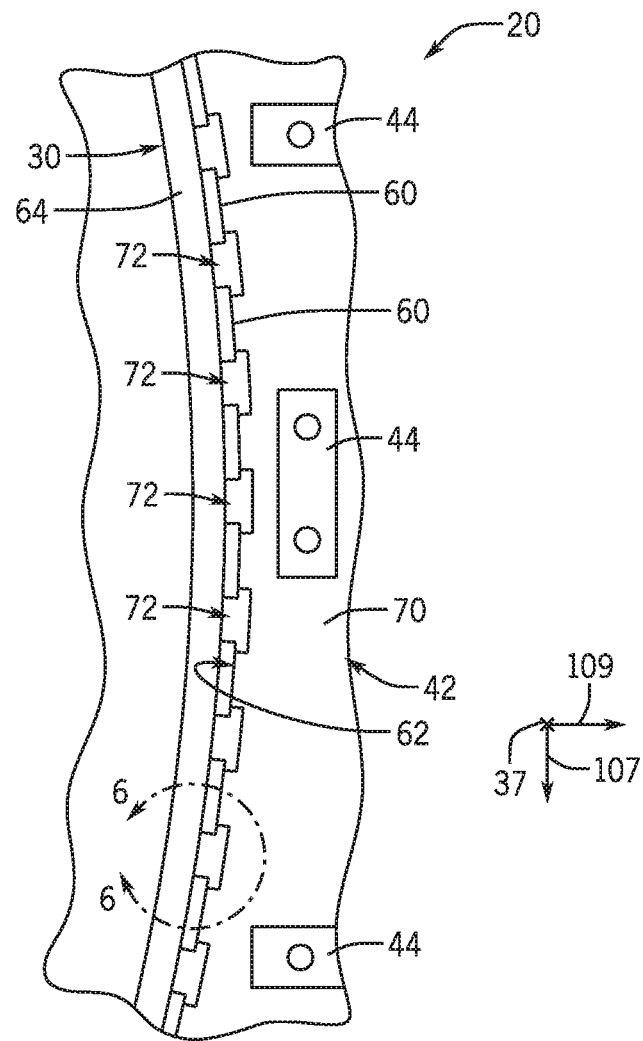
FIG. 5 is a top schematic view of a portion of an embodiment of a bus bar carrier and housing for use in the battery module of FIG. 3, in accordance with an aspect of the present disclosure.
Figure 6:
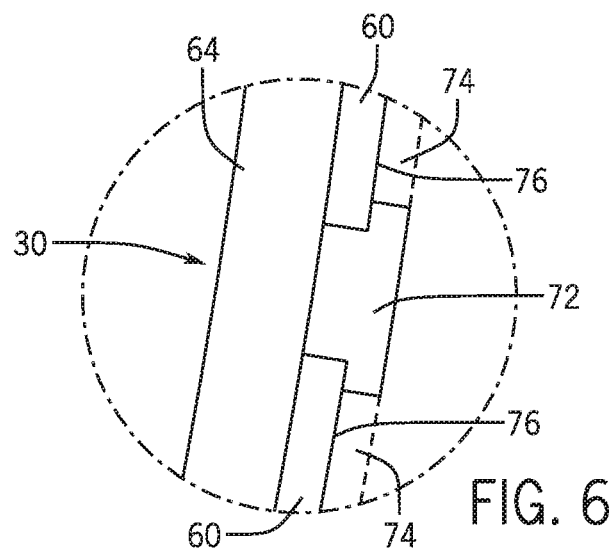
FIG. 6 is a detailed view of a portion of the bus bar carrier and housing of FIG. 5, in accordance with an aspect of the present disclosure.

A schematic view of an embodiment of the bus bar carrier 42 having the flexible ribs 60 in a flexed condition (e.g., in response to curvature of the walls 64 of the housing 30) is shown in FIG. 5, and a detailed schematic view of a portion of the bus bar carrier 42 of FIG. 5 is shown in FIG. 6. In the illustrated embodiments, the flexible ribs 60 extend upwardly (e.g., in direction 37) from the base 70 of the bus bar carrier 42. In particular, each of the flexible ribs 60 extends from the base 70 along the perimeter 62 of the bus bar carrier 42. Further, adjacent ribs 60 are separated from each other by a space 72. In other words, each of the flexible ribs 60 is coupled to the bus bar carrier 42 independently of the other flexible ribs 60. For example, as shown in FIG. 6, each space 72 may extend through the base 70 of the bus bar carrier 42. Accordingly, each rib 60 in the illustrated embodiment is defined by a first portion 74 extending from the base 70 of the bus bar carrier 42 and parallel to a plane of the base 70 (e.g., along direction 109), and a second portion 76 extending substantially perpendicular to the first portion 74 (e.g., in direction 37). Thus, the first portion 74 (or a connection region between the first portion 74 and the second portion 76) may serve as the flex or hinge region of the rib 60 about which the second portion 76 flexes.

Focusing on FIG. 5, the illustrated wall 64 of the housing 30 is curved along direction 107. The wall 64 may be curved or inconsistently shaped due to manufacturing imperfections, thermal expansion during operation of the battery module 20, or for some other reason. The flexible ribs 60 extend upwardly (e.g., in direction 37) from the base 70 of the bus bar carrier 42 and interface with the curved wall 64 of the housing 30. For example, the flexible ribs 60 flex to enable intimate contact between the bus bar carrier 42 and the wall 64 of the housing 30. It should be noted that the illustrated curvature may be exaggerated for clarity, that curvature of any of the walls 64 of the housing 30 or of the bus bar carrier 42 itself may be along any direction or combination of directions (e.g., direction 37, direction 107, direction 109, or a combination thereof), and the flexible ribs 60 may at least partially accommodate any curvature or inconsistent shape along any direction or combination of directions.

Figure 7:
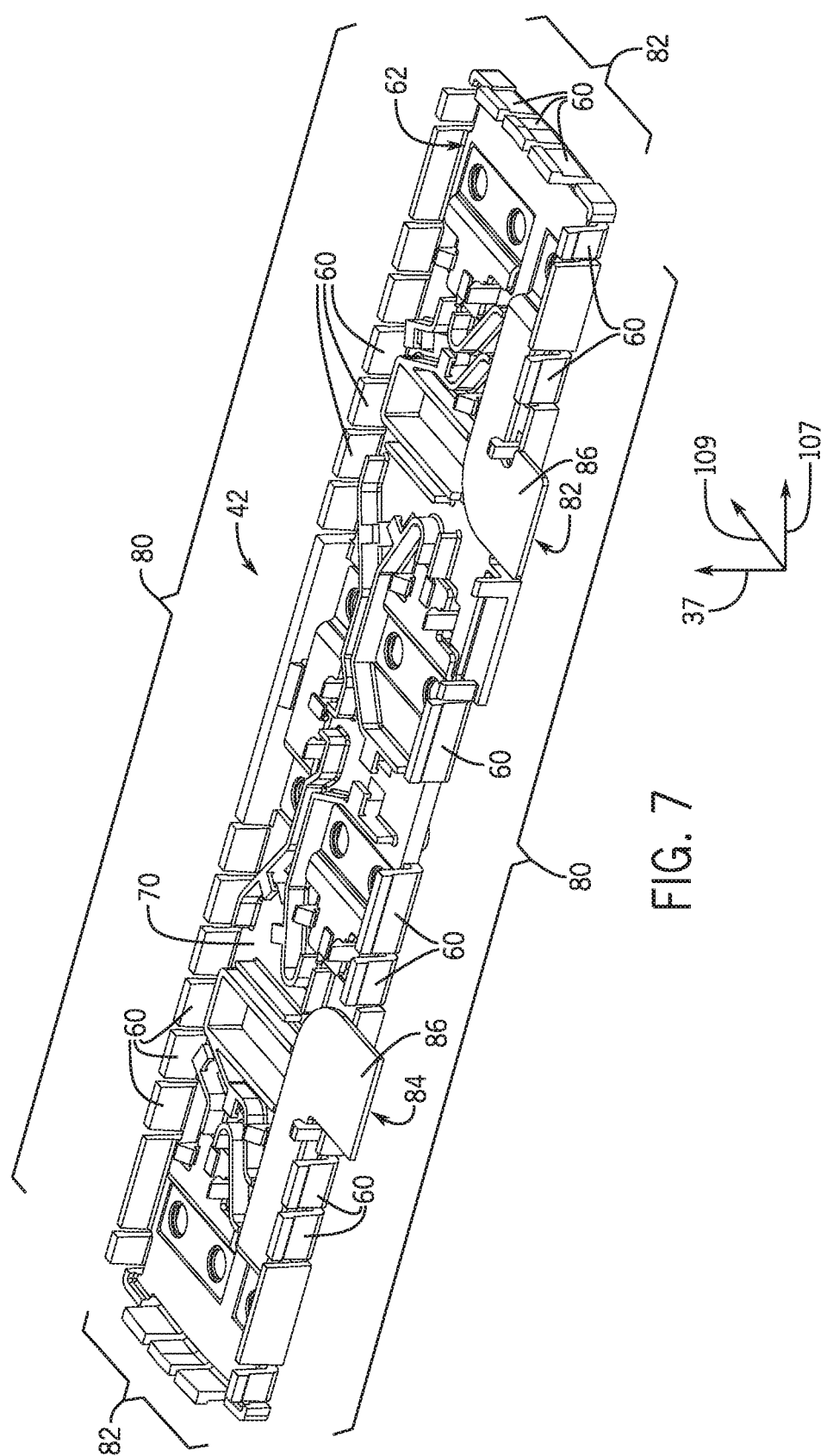
FIG. 7 is a perspective view of an embodiment of a bus bar carrier for use in the battery module of FIG. 3, in accordance with an aspect of the present disclosure.

Turning now to FIG. 7, a perspective view of an embodiment of the bus bar carrier 42 for use in the battery module 20 of FIG. 3 is shown. In the illustrated embodiment, the flexible ribs 60 extend along the perimeter 62 of the bus bar carrier 42, as previously described, and upwardly (e.g., in direction 37) from the base 70 of the bus bar carrier 42. As shown, the bus bar carrier 42 is rectangular in shape, with two long sides 80 and two short sides 82 (although, in another embodiment, the bus bar carrier 42 may include another shape, such as a square). Any number of flexible ribs 60 may extend along each of the long and short sides 80, 82 of the bus bar carrier 42. For example, in the illustrated embodiment, three flexible ribs 60 are disposed along each of the short sides 82, although 2, 3, 4, 5, 6, 7, 8, 9, 10, or more flexible ribs 60 may be disposed along each of the short sides 82 in other embodiments. Further, any number of flexible ribs 60 may be disposed along the long sides 80 of the bus bar carrier 42 (e.g., 2-30 flexible ribs 60, or more, may be disposed along each of the long sides 80).

Further, the flexible ribs 60 may all include the same or a similar size and/or shape, or the flexible ribs 60 may vary in size and/or shape. For example, as shown, many of the flexible ribs 60 correspond in shape and size, although certain of the flexible ribs 60 are smaller and certain of the flexible ribs 60 are larger. The size and shape of each flexible rib 60 may depend, at least in part, on a location of the flexible rib 60 relative to other components of the bus bar carrier 42. For example, as shown, the bus bar carrier 42 includes two openings 84 through the flexible ribs 60 to enable passage of bus bars 86 therethrough (e.g., bus bars 86 that enable coupling of the electrochemical cells to major terminals of the battery module). Certain of the flexible ribs 60 extending along the long side 80 of the bus bar carrier 42 having the two openings 84 may be larger than other of the flexible ribs 60 extending along the perimeter 62 of the bus bar carrier 42 in order to accommodate the two openings 84.

Figure 8:
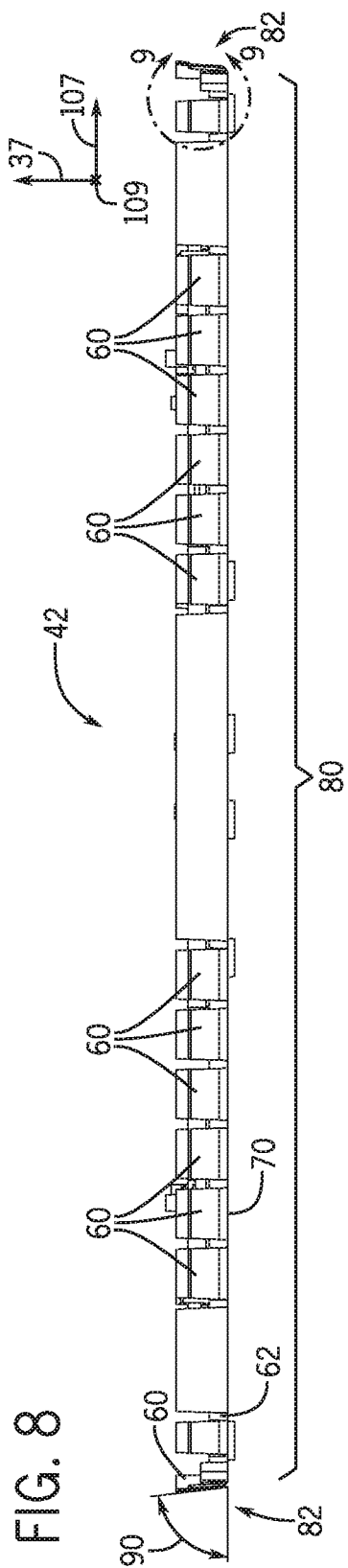
FIG. 8 is a front view of the bus bar carrier of FIG. 7, in accordance with an aspect of the present disclosure.
Figure 9:
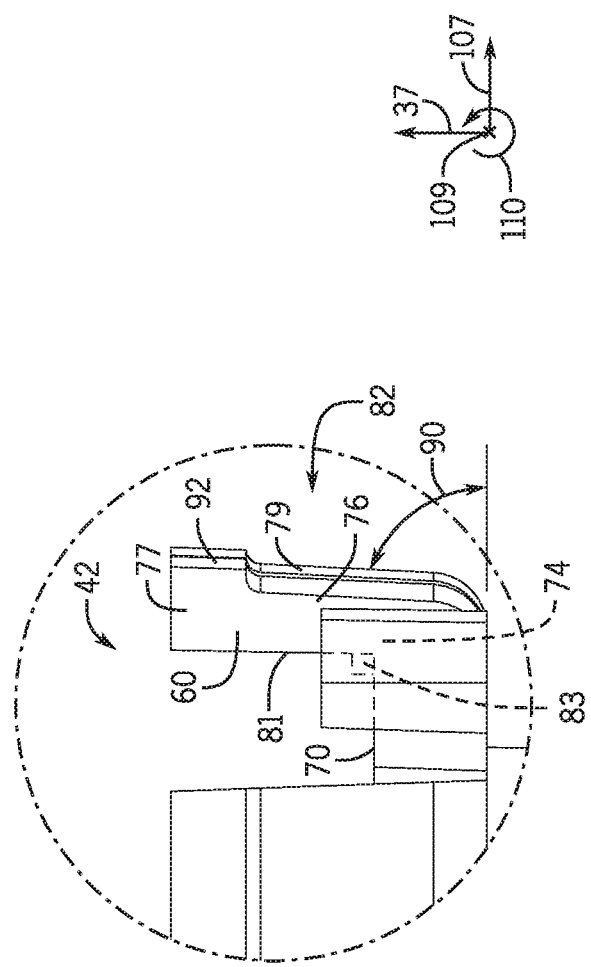
FIG. 9 is a detailed view of a portion of the bus bar carrier of FIG. 8 taken along lines 9-9 in FIG. 8, in accordance with an aspect of the present disclosure.
Figure 10:
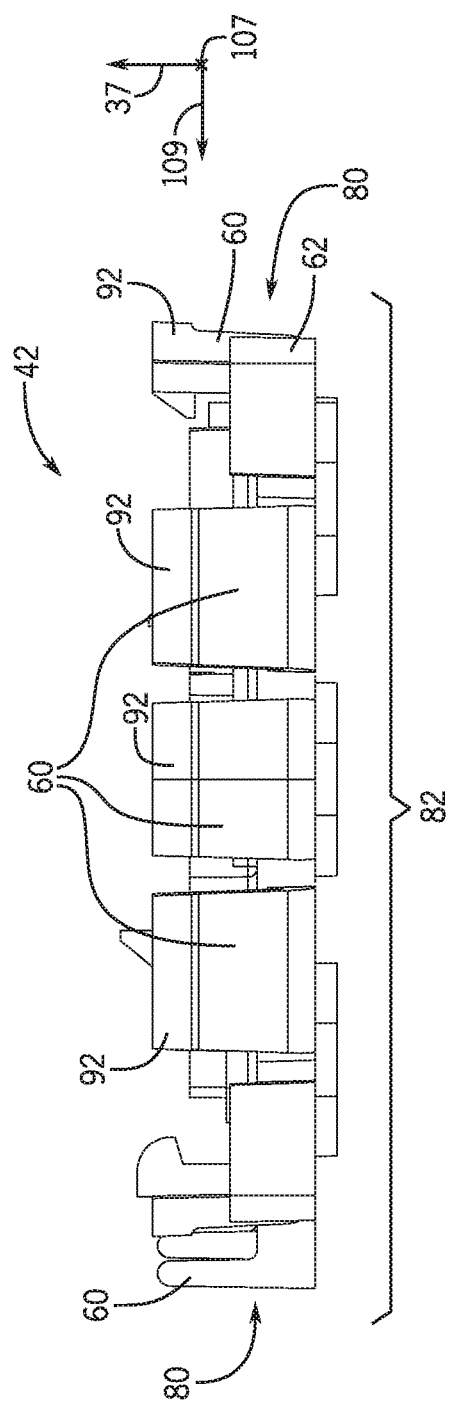
FIG. 10 is a side view of the bus bar carrier of FIG. 7, in accordance with an aspect of the present disclosure.

Front, detailed, and side views of embodiments of the bus bar carrier 42 are shown in FIGS. 8, 9, and 10 respectively, where FIG. 9 is a detailed view taken along lines 9-9 of FIG. 8. As shown in FIG. 9, the flexible ribs 60 may be angled outwardly from the base 70 of the bus bar carrier 42 at an angle 90. For example, the illustrated flexible rib 60 (e.g., disposed along the short side 82 of the bus bar carrier 42 in FIG. 9) includes the first portion 74 extending from the base 70 of the bus bar carrier 42 (e.g., along direction 107), the second portion 76 extending upwardly from the first portion 74, and a third portion 77 extending from the second portion 76 (e.g., where the third portion 77 extends substantially parallel with the first portion 74 along direction 107). As shown, a face 79 (e.g., beveled face) of the second portion 76 of the flexible rib 60 is angled (e.g., beveled) with respect to the base 70 of the bus bar carrier 42 at a non-90 degree angle 90. In other words, the illustrated angle 90 is acute. Accordingly, as the bus bar carrier 42 is inserted into the cell receptacle region of the housing, the flexible ribs 60 may contact the walls of the housing, which causes the flexible ribs 60 to rotate about annular direction 110 and to be pushed inwardly toward the base 70, thereby causing the angle 90 to increase (e.g., toward 90 degrees) and causing the forces exerted between the flexible ribs 60 and the walls of the housing to which the flexible ribs 60 are welded to increase. In other words, by including the angles 90 for each of the flexible ribs 60, the flexible ribs 60 may more firmly contact the walls of the housing. The firm (e.g., intimate) contact between the flexible ribs 60 and the walls of the housing facilitates ease, accuracy, and effectiveness of welding the ribs 60 to the walls of the housing. In other words, the intimate contact between the flexible ribs 60 and the walls of the housing enables stronger, more resilient welds between the flexible ribs 60 and the walls.

It should be noted that the flexible ribs 60 along the long sides 80 of the bus bar carrier 42 (e.g., as shown in FIG. 8) also function similarly to those along the short sides 82 of the bus bar carrier 42 as shown in FIG. 9 and described above (e.g., in that the ribs 60 along the long sides 80 of the bus bar carrier 42 are also angled with respect to the base 70 such that the ribs 60 rotate and/or are pushed inwardly toward the base 70 as the ribs 60 contact the walls of the housing). Further, it should be noted that, as shown in FIG. 9, a face 81 of the flexible rib 60 opposite from the face 79 (e.g., outer face) of the second portion 76 of the flexible rib 60 may extend in direction 37 (e.g., with a 90 degree angle 83 between the face 81 and the base 70 or the first portion 74 of the flexible rib 60). However, in another embodiment, the face 81 may be angled (e.g., beveled) similar to the face 79 of the second portion 76.

Focusing now on FIG. 10, each of the flexible ribs 60 may also include a lip 92 extending outwardly (e.g., in direction 107 and 109, depending on the side 82, 80 of the bus bar carrier 42) from the flexible ribs 60 (e.g., away from the perimeter 62 of the bus bar carrier 42). The lips 92 may contact an edge of the housing (e.g., on the upper face 40 of the housing 30 in FIG. 3) to help retain the bus bar carrier 42 within a particular position in the cell receptacle region of the housing. The lips 92 may generally be a part of the third portion 77 of the flexible rib 60 extending from the second portion 76 of the flexible rib 60, as shown in FIG. 9).

One or more of the disclosed embodiments, alone or in combination, may provide one or more technical effects useful in the manufacture of battery modules, and portions of battery modules. In general, embodiments of the present disclosure are directed to a battery module having a housing and a bus bar carrier with flexible ribs (e.g., fingers) configured to enable positioning and retention of the bus bar carrier within a region (e.g., a cell receptacle region or opening) of the housing. The flexible ribs flex in response to forces exerted against the flexible ribs by walls of the housing as the bus bar carrier is positioned within the cell receptacle region. The flexible ribs enable intimate contact between the bus bar carrier and the walls of the housing, in part to compensate for curves and/or manufacturing imperfections (e.g., tolerances) of the walls of the housing. The intimate contact between the bus bar carrier and the walls of the housing, enabled by the flexible ribs, improves welding of the bus bar carrier to the walls of the housing. For example, the intimate contact facilitates ease of the welding, and facilitates strength or resilience of the welds. Further still, after welding the flexible ribs to the walls of the housing, the flexible ribs may flex in response to thermal expansion or other factors during operation of the battery module. For example, as the walls of the housing thermally expand, the flexible ribs may flex to compensate for movement of the walls of the housing, thereby reducing undesired forces that would otherwise be exerted more fully on the welds themselves. Thus, the flexible ribs may increase a life time of the welds between the bus bar carrier and the walls of the housing. The technical effects and technical problems in the specification are exemplary and are not limiting. It should be noted that the embodiments described in the specification may have other technical effects and can solve other technical problems.

While only certain features and embodiments have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the disclosed subject matter. The order or sequence of any process or method steps may be varied or re-sequenced according to alternative embodiments. Furthermore, in an effort to provide a concise description of the exemplary embodiments, all features of an actual implementation may not have been described. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A battery module, comprising:
a housing defined by a plurality of walls joined together to define an interior, the interior forming a cell receptacle region, wherein the cell receptacle region is configured to enable passage of a plurality of electrochemical cells therethrough and into the interior of the housing; and
a bus bar carrier comprising a base surrounded by a perimeter, wherein the perimeter comprises a plurality of spaced apart, upwardly extending flexible ribs, wherein upwardly extending is an orientation extending away from the interior of the housing; and
wherein the spaced apart, upwardly extending flexible ribs are engaged with the plurality of walls in the cell receptacle region such that one or more of the plurality of flexible ribs is flexed inwardly toward the base by one or more of the plurality of walls in the cell receptacle region.

2. The battery module of claim 1, wherein the plurality of flexible ribs comprise a plastic material.

3. The battery module of claim 1, comprising a plurality of bus bars disposed on the bus bar carrier and interfacing with the plurality of electrochemical cells disposed in the housing.

4. The battery module of claim 3, wherein the bus bar carrier comprises:
a top surface on which the plurality of bus bars is disposed; and
a plurality of openings adjacent to the plurality of bus bars enabling an interface between the plurality of bus bars and a plurality of terminals of the plurality of electrochemical cells disposed in the housing.

5. The battery module of claim 3, wherein the bus bar carrier comprises:
a first opening through the perimeter of the bus bar carrier, wherein the first opening is configured to enable passage of a first bus bar therethrough; and
a second opening through the perimeter of the bus bar carrier, wherein the second opening is configured to enable passage of a second bus bar therethrough.

6. The battery module of claim 1, wherein the plurality of flexible ribs comprise a corresponding plurality of transverse portions, wherein the plurality of transverse portions extend at non-right angles relative to the base of the bus bar carrier, and wherein the plurality of transverse portions is flexed inwardly toward the base by the cell receptacle region.

7. The battery module of claim 6, comprising a plurality of extensions corresponding to the plurality of flexible ribs, wherein the plurality of extensions extend from the base of the bus bar carrier between the base and the plurality of transverse portions.

8. The battery module of claim 7, wherein the plurality of extensions and the base are joined to form a flat surface across the base and the plurality of extensions.

9. The battery module of claim 6, comprising a plurality of hinge regions corresponding to the plurality of flexible ribs, wherein the plurality of hinge regions enable the plurality of transverse portions of the plurality of flexible ribs to be flexed inwardly toward the base by the cell receptacle region.

10. A bus bar carrier of a battery module, the bus bar carrier comprising:
a plurality of bus bars;
a base portion on which the plurality of bus bars is disposed; and
a perimeter extending around the base portion, wherein the perimeter comprises a plurality of spaced apart, upwardly extending flexible ribs, wherein upwardly extending is an orientation approximately perpendicular to the base portion, said plurality of spaced apart, upwardly extending flexible ribs being spaced around the perimeter and configured to engage a cell receptacle surface of a housing of the battery module such that the plurality of flexible ribs is flexed inwardly toward the base portion by the cell receptacle surface.

11. The bus bar carrier of claim 10, wherein the plurality of flexible ribs comprise a plastic material.

12. The bus bar carrier of claim 11, wherein the base portion comprises the plastic material.

13. The bus bar carrier of claim 10, wherein the bus bar carrier comprises a plurality of openings configured to enable an interface between the plurality of bus bars and a plurality of terminals of a plurality of electrochemical cells in the housing of the battery module.

14. The bus bar carrier of claim 10, comprising:
- a first opening through the perimeter of the bus bar carrier, wherein the first opening is configured to enable passage of a first bus bar therethrough; and
- a second opening through the perimeter of the bus bar carrier, wherein the second opening is configured to enable passage of a second bus bar therethrough.

15. The bus bar carrier of claim 10, comprising a plurality of transverse portions corresponding to the plurality of flexible ribs, wherein the plurality of transverse portions extend at non-right angles relative to the base portion of the bus bar carrier, and wherein the plurality of transverse portions is configured to engage the cell receptacle surface of the housing of the battery module such that the plurality of transverse portions is flexed inwardly toward the base portion by the cell receptacle surface.

16. The battery module of claim 15, comprising a plurality of extensions corresponding to the plurality of flexible ribs, wherein the plurality of extensions extend from the base portion of the bus bar carrier between the base portion and the plurality of transverse portions.

17. The battery module of claim 16, wherein the plurality of extensions and the base portion are joined to form a flat surface across the base portion and the plurality of extensions.

18. The battery module of claim 15, comprising a plurality of hinge regions corresponding to the plurality of flexible ribs, and configured to enable the plurality of transverse portions of the plurality of flexible ribs to flex inwardly toward the base of the bus bar carrier by the cell receptacle surface.

19. A bus bar carrier of a battery module, the bus bar carrier comprising:
- a base portion configured to receive a plurality of bus bars of the battery module; and
- a perimeter extending around the base portion, wherein the perimeter comprises a plurality of upwardly extending flexible ribs spaced about the perimeter, wherein upwardly extending is an orientation approximately perpendicular to the base portion, and wherein each rib of the plurality of flexible ribs comprises a first portion extending from the base portion to form a flat surface across the first portion and the base portion, a transverse portion extending at a non-right angle relative to the first portion and the base portion, and a connecting region between the first portion and the transverse portion, wherein the connecting region acts as a hinge about which the transverse portion is configured to be flexed inwardly toward the base portion by a cell receptacle surface of a housing of the battery.

* * * * *